June 15, 1971  J. MAZZARINS  3,584,405
SCRAPER HAVING PLURAL BOWLS
Filed Nov. 8, 1968  3 Sheets-Sheet 2
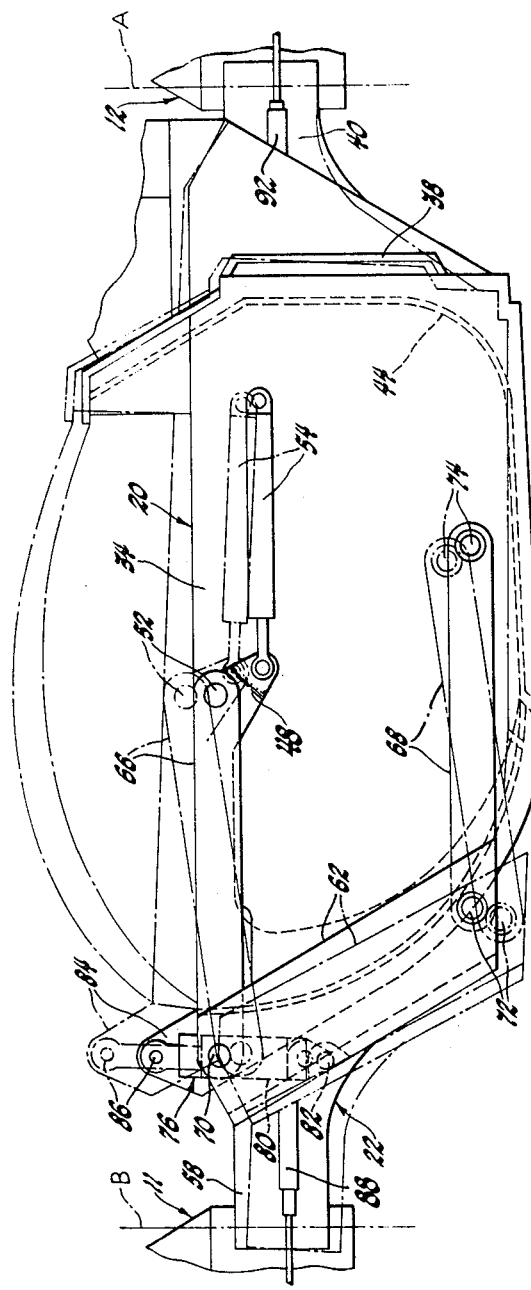
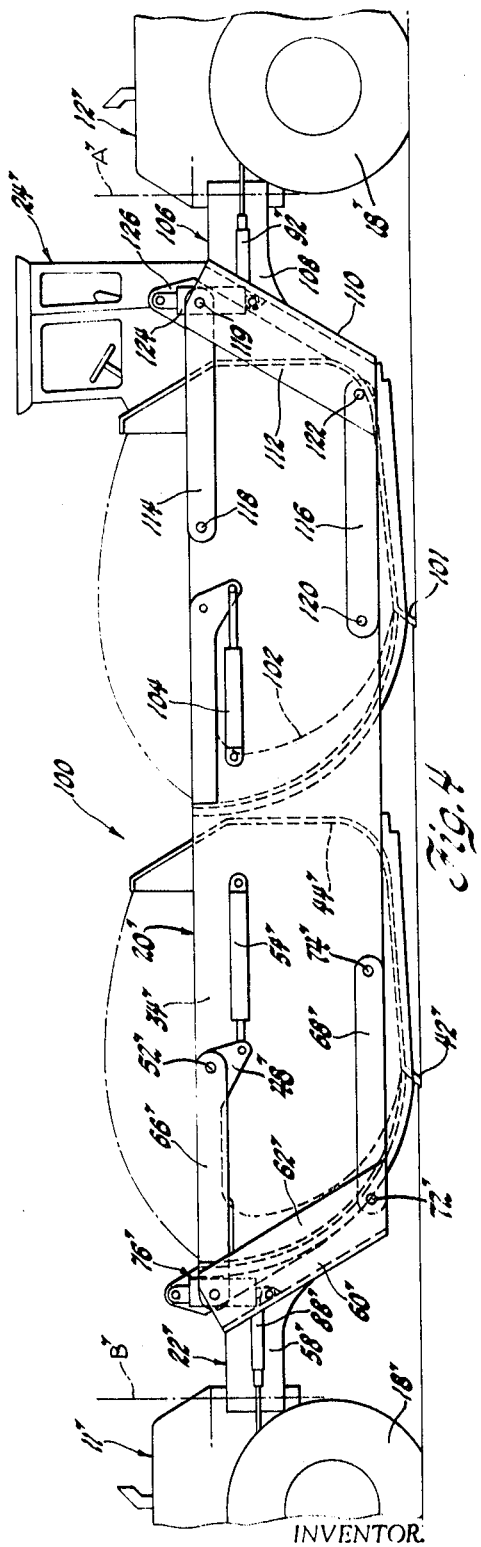
INVENTOR.
Janis Mazzarins
BY
E. J. Biskup
ATTORNEY

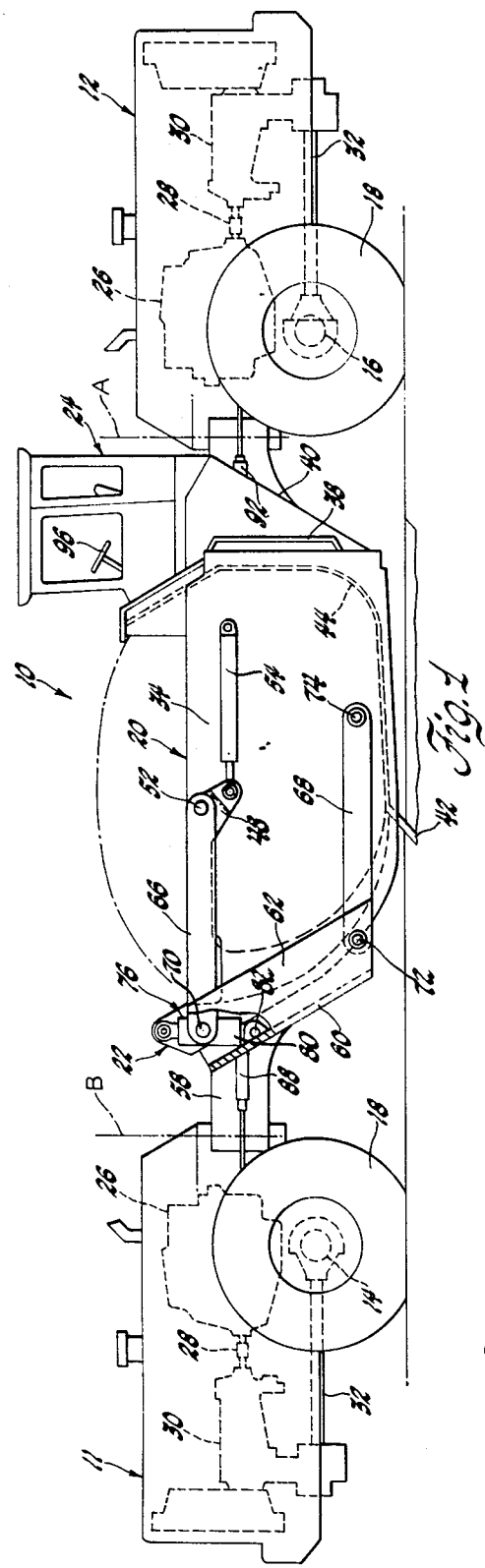

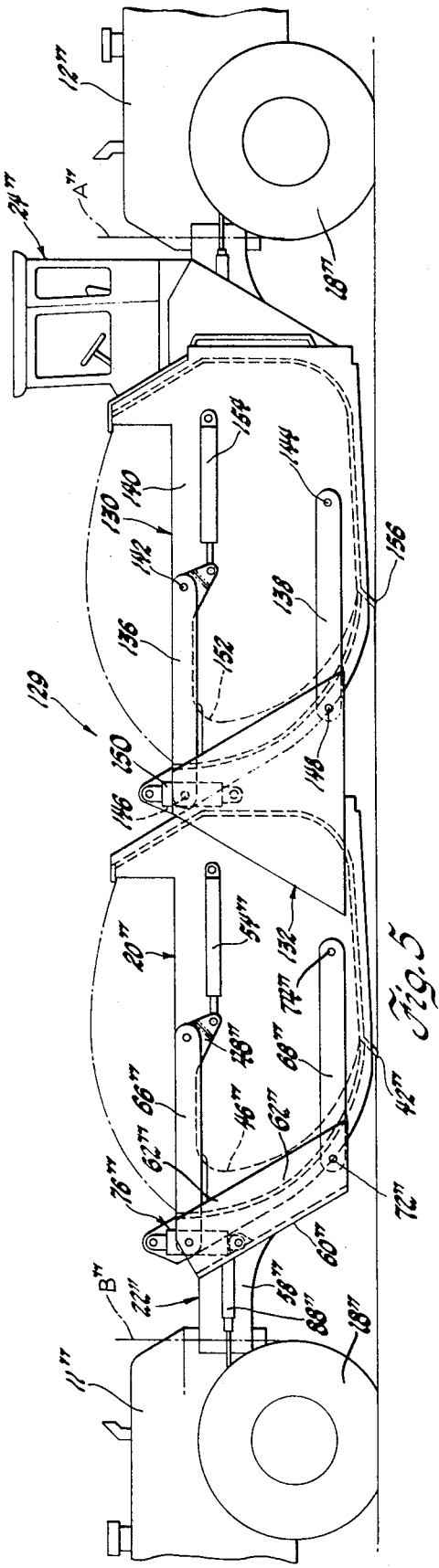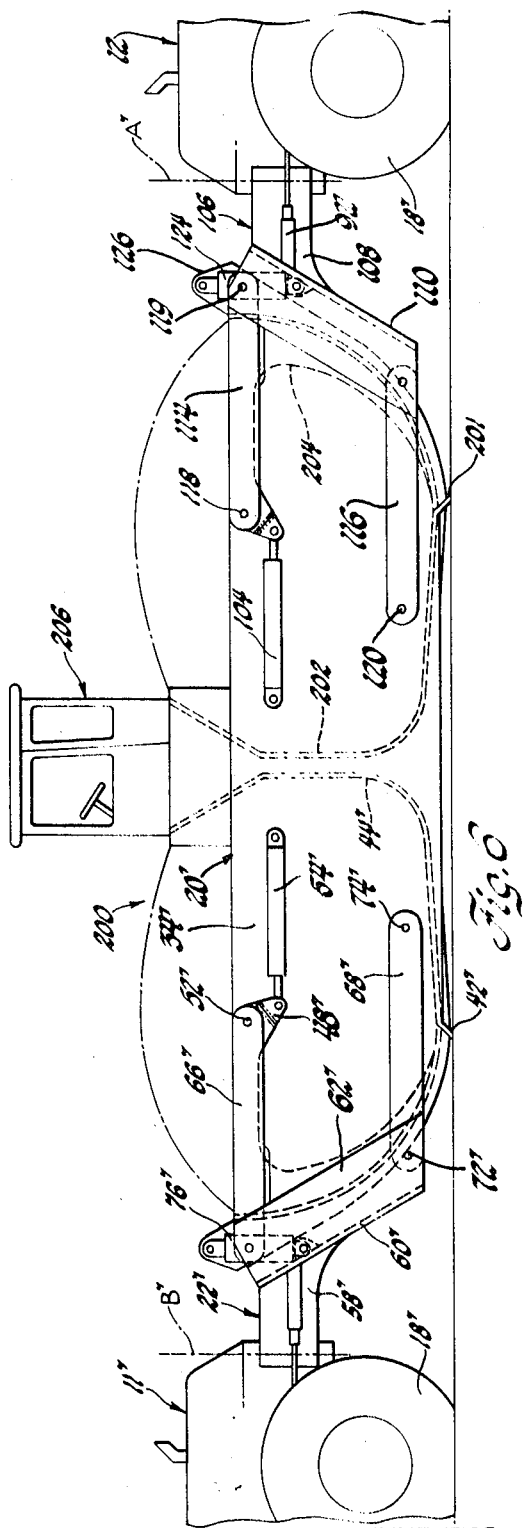

United States Patent Office 3,584,405
Patented June 15, 1971

3,584,405
SCRAPER HAVING PLURAL BOWLS
Janis Mazzarins, Macedonia, Ohio, assignor to General Motors Corporation, Detroit, Mich.
Filed Nov. 8, 1968, Ser. No. 774,472
Int. Cl. E02f 3/64
U.S. Cl. 37—127                                3 Claims

ABSTRACT OF THE DISCLOSURE

A scraper including a tractor and a trailing bowl wherein the tractor is steerable about a vertical axis relative to the bowl and the latter is supported by a draft assembly for movement between a raised-carry position and a lowered-dig position. The draft assembly includes a support frame having a transversely extending section terminating at each end with a side section which in turn pivotally supports one end of upper and lower substantially parallel and horizontally extending arms located along each side of the trailing bowl. The other ends of the arms are pivotally connected to the side walls of the bowl.

---

One form of scraper presently manufactured includes an overhung tractor which is connected by a hitch to a transportable bowl. The hitch provides for relative articulation of the tractor about a vertical steer axis and is connected to a pull yoke having a gooseneck or drawbar which extends rearwardly for rigid connection with a torque tube, the opposite ends of which support laterally spaced arms that extend rearwardly for pivotal connection with the side walls of the scraper bowl. Suitable hydraulic means are supported by the gooseneck for raising and lowering the bowl so that the latter can assume a carry position and a dig position.

The present trend in the design of scrapers of the above-described type is toward increasing the capacity of the bowl, and inasmuch as width dimensions of a scraper are to a great extent fixed by maximum shipping dimensions set by carriers, most efforts have been directed toward lengthening the bowl so as to realize an increased payload. As the length of the bowl increases, however, a corresponding increase in the length of the pull arms is required in order to support the bowl and provide the stability and support necessitated by the form of use to which the scraper is placed. Since the pull arms of a conventional pull yoke are nothing more than cantilever beams subjected to flexural type bending, their cross-sectional size as well as the size of the torque tube must be substantially enlarged to enable the increased payload in the bowl and the forces at the cutting blade to be tolerated without causing a rupture. In most cases, such design will cause the pull yoke to exceed maximum shipping dimensions unless the pull yoke is made in parts which can be disassembled for shipping purposes and reassembled at the job site. This, however, is not considered to be the most satisfactory solution to the problem and, accordingly, scraper designers are constantly looking for better draft arrangements which will not present the bulk and weight problems encountered when the present pull yoke design is utilized with lengthened bowls.

The present invention contemplates an earthmoving scraper vehicle having a unique overall construction which is particularly adapted for use with scraper bowls having increased lengths and payload capacities. One important feature of this invention is that it utilizes a draft assembly having a pair of substantially parallel and horizontally extending arms located on each side of the bowl for connecting the latter with a drawbar or support frame having a hitch supported on the tractor. One end of the arms are pivotally mounted to the side sections of the support frame, while the other end of each arm is pivotally connected to the side wall of the scraper. In the preferred form, the arms are separated from each other a distance substantially equal to the vertical dimension of the bowl and the pivot connections thereof are so located that when the scraper bowl is in the carry position, the upper arm is placed essentially in compression and the lower arm is placed essentially in tension and, therefore, experience very little, if any, flexural bending of the type which the conventional pull yoke is subjected to.

The objects of the present invention are to provide a scraper having increased load capacity in relation to its wheel base dimension and having a bowl located between a pair of steerable tractor units; to provide an all-wheel drive scraper having a tractor unit steerable about a vertical axis relative to a trailing bowl and including vertically spaced parallel arms located in pairs on each side of the bowl for supporting the latter between a carry position and a dig position; to provide a scraper having a four bar linkage type draft assembly that includes a pair of substantially parallel and horizontally extending arms, one of which is subjected to compression forces and the other to tension forces while carrying a load, and to provide a scraper bowl having a support linkage which includes a support frame, and intermediate portion of which is carried by a tractor and having side sections located outboard of a scraper bowl side wall and include support arms for pivotally supporting the bowl for movement about a transverse horizontal axis.

Other objects and advantages of the present invention will be apparent from the following detailed description when taken with the drawings in which:

FIG. 1 shows a rubber-tired scraper made in accordance with the invention;

FIG. 2 is a plan view showing the scraper of FIG. 1.

FIG. 3 is an enlarged view of the draft assembly incorporated with the scraper of FIG. 1 and shows the relative positions assumed by the various members thereof when the bowl is in the raised-carry position and the lowered-dig position, and FIGS. 4, 5 and 6 show modified forms of scrapers incorporating the draft assembly of FIGS. 1 through 3.

Referring now to the drawings and more particularly to FIGS. 1 and 2 thereof, an earthmoving scraper 10 made according to the invention is shown comprising a front drive unit or tractor 11 and a rear drive unit or tractor 12 which are respectively supported by tansverse axles 14 and 16, the opposite ends of which rotatably support rubber-tired wheels 18. Located between the drive units 11 and 12 is a scraper bowl 20, the front end of which is connected to the front drive unit 11 by a draft assembly 22 which is a feature of this invention. The rear of the scraper bowl 20 supports an operator's cab 24 and is connected in a manner to be described to the rear drive unit 12.

Each of the drive units 11 and 12 includes an engine 26 which is connected through a suitable shaft 28 to a transmission and gear box assembly 30 which in turn supplies drive through a drive shaft 32 to the associated axle. Thus, the scraper 10 is an all-wheel drive vehicle with suitable engine and transmission controls (not shown) being located within the operator's cab 24.

The scraper bowl 20 comprises the usual laterally spaced side walls 34 and 36, the rear ends of which are connected by a transversely extending structural member 38 that is rigidly joined to a support frame 40 which carries the operator's cab 24 and serves as a hitch for pivotally connecting the rear drive unit 12 with the bowl for relative steering movement about a substantially vertical axis indicated by the letter A. The scraper bowl 20 is open at its front end and has a transversely extending substantially horizontal cutting blade 42 rigidly fixed between the side walls 34 and 36 at the lower end thereof. An ejector 44 is located in the rear of the scraper bowl 20 and can take one of many forms known to those skilled in the art for purposes of discharging the material either out of the front opening of the bowl or dropping the load from the bottom of the bowl. An apron 46 is adapted to close the open front of the bowl 20 and has a pair of arms 48 and 50, each of which has one end thereof connected to the associated side wall by a pivotal connection 52 that provides for movement of the apron about a transversely horizontal axis. The apron 46 is operated by a pair of hydraulic cylinders 54 and 56, each of which is pivotally connected between the associated side wall and a depending portion of the apron arm.

The draft assembly 22 supports the front end of the scraper bowl 20 and comprises a support frame 58 that extends forwardly for pivotal connection along a vertical steer axis B with the front drive unit 11. The support frame 58 is rigidly secured to a transversely extending plate section 60 at an intermediate portion thereof, and the opposite ends of the plate section 60 terminate with integral downwardly extending and rearwardly inclined side sections 62 and 64. Each side section 62, 64 supports an upper arm or link 66 and a lower arm or link 68. The longitudinal axes of the arms 66 and 68 are located in substantially parallel and horizontally extending planes. As viewed in FIG. 3, the upper arm 66 has the forward end thereof pivotally connected to the side section 62 by a pivotal connection 70, while the rear end is pivotally supported by the pivotal connection 52 which also supports the arm 48 of the apron 46. The forward end of the lower arm 68 is connected to the side section 62 by a pivotal connection 72, while the rear end of the arm 68 is connected to the side wall 34 by a pivotal connection 74. It will be understood that the arms 66 and 68 along the opposite side of the bowl are connected by similar pivotal connections located on side section 64 and side wall 36. Thus, the upper and lower arms 66 and 68 on both sides of the scraper bowl 20 form a parallelogram 4-bar linkage which controls movement of the bowl as seen in FIG. 3 between the lowered-dig position shown in full lines and a raised-carry position shown in phantom lines.

Movement of the scraper bowl 20 between the two positions mentioned above is provided by a pair of vertically orientated and laterally spaced hydraulic bowl cylinders 76 and 78, each of which has a cylinder portion 80 connected to the plate section 60 by a pivotal connection 82. The piston rod of each of the bowl cylinders 76 and 78 is connected to a forwardly located extension 84 of the scraper bowl 20 by a pivotal connection 86. Thus, by providing pressurized fluid to the lower end of each cylinder portion 80 while the upper end thereof is being vented, the bowl cylinders 76 and 78 expand in unison so as to raise the scraper bowl 20 to the carry position wherein the cutting blade 42 is out of engagement with the ground. In this position, the apron 46 is normally closed completely and the material which has been loaded in the scraper bowl 20 can be hauled to another location and be discharged. Contraction of the bowl cylinders 76 and 78 causes the scraper bowl 20 to move to the full line position of FIG. 3 at which time the blade 42 can engage the ground and proceed to cut the material which flows into the bowl while the front and rear drive units 11 and 12 propel the scraper 10 in a forwardly direction.

Referring to FIGS. 1 and 2, steering of the scraper 10 described above is realized through a pair of double-acting hydraulic steer cylinders 88 and 90 pivotally connected to and extending between the front drive unit 11 and the support frame 58, and a pair of double-acting hydraulic steer cylinders 92 and 94 pivotally connected to and extending between the support frame 40 and the rear drive unit 12. Inasmuch as both drive units 11 and 12 are pivotally connected with the scraper bowl 20 for relative articulation about steer axes A and B, a shorter turning radius is realized and hence more efficient scraper operation is obtainable. The steer cylinders 88, 90 and 92, 94 associated with the respective drive units 11 and 12 are under the control of a steering wheel 96 located in the operator's cab 24. Although not shown, the steering wheel 96 is connected in a conventional manner to a steer valve which forms a part of a suitable hydraulic circuitry that supplies pressurized fluid to one end or the other to each of the steer cylinders while venting the opposite end. FIG. 2 depicts in phantom lines the drive units 11 and 12 being located in turned positions which would provide a minimum turning radius for the scraper 10. It can be seen from this view that the positions of the drive units 11 and 12 would be obtained when the steering wheel 96 is rotated in a clockwise direction thereby causing the front drive unit 11 to move clockwise about the steer axis B due to the expansion of cylinder 88 and the contraction of cylinder 90, while the rear drive unit 12 would rotate counterclockwise about steer axis A due to the expansion of cylinder 92 and the contraction of cylinder 94.

One feature of the draft assembly 22 described above is that the upper and lower arms 66 and 68 are intended to experience little, if any, flexural type bending when the scraper is in a raised-carry position. In this regard, it will be noted that as seen in FIG. 3, the upper and lower arms 66 and 68 are pivotally connected between the side section 62 and the side wall 34 of the scraper bowl 20 at vertically spaced points so located that the lower arm 68 will be placed substantially in tension and the upper arm 66 will be placed substantially in compression.

FIGS. 4, 5 and 6 of the drawings show the draft assembly made according to the invention incorporated with modified forms of scraper 10 disclosed in FIGS. 1, 2 and 3. Accordingly, those portions of the modified scrapers corresponding to those already described in connection with scraper 10 shall be identified by the same numerals but primed. Also, inasmuch as only one side of the modified scrapers is shown, it will be understood that identical parts corresponding to those to be described are located on the other side of the scraper.

FIG. 4 shows a tandem bowl type scraper 100 in which the side walls 34' and 36' in effect have been lengthened so as to form a secondary material retaining portion which also has a forward opening immediately to the rear of the ejector 44'. A horizontal cutting blade 101 is located between the side walls of the bowl 20' and the secondary opening is closed by an apron 102 that is operated by a hydraulic cylinder 104. It will be noted that the rear of the bowl 20' supports an operator's cab 24' and is provided with a draft assembly 106 that is a mirror image of the draft assembly 22' located at the front end of the bowl and includes the support frame 58', plate section 60', side section 62', and upper and lower arms 66' and 68'. Thus, it can be seen that the draft assembly 106 has a corresponding support frame 108 rigidly secured to a similar transverse plate section 110 which has a side section 112. Moreover, the side section 112 also includes an upper arm 114 and lower arm 116 which are respectively pivotally connected at points 118, 119 and 120, 122 between the side section 112 and the side wall of the bowl. A hydraulic cylinder 124 pivotally extends between the plate section 110 and an extension 126 at the rear end of the bowl and serves to provide vertical adjustment thereof.

From the above description, it should be apparent that with the scraper arrangement as shown in FIG. 4, both ends of the bowl are supported by draft assemblies made according to the invention and, therefore, the front end of the bowl or the rear end of the bowl or both ends can be adjusted in position through the operation of the hydraulic cylinders 76' and 124. It will be noted that the scraper 100 is propelled by rubber-tired drive units 11' and 12' which are connected to the draft assemblies 22' and 106 for steering movement about vertical steer axes B' and A'. Moreover, assuming sufficient power is provided by the drive units 11' and 12', the cutting blades 42' and 101 can be located at varying heights so as to permit both blades to cut material simultaneously. On the other hand, it is possible with this form of scraper to first load one portion of the bowl and then the other.

FIG. 5 also shows a tandem bowl scraper arrangement 129 of the type shown in FIG. 4 except in this case two bowls 20" and 130 are provided, each of which is independent of the other and separated therefrom by an intermediate frame member 132 which constitutes a second pair of laterally spaced side sections. The forward end of the frame member 132 is rigidly connected to the rear end of the front bowl 20" which in turn is supported by the draft assembly 22" comprising a support frame 58", plate section 60", side section 62", and control arms 66" and 68". Thus, the draft assembly 22" is identical in construction to the draft assemblies 22 and 22' incorporated with the scrapers shown in FIGS. 3 and 4 and also includes a hydraulic cylinder 54" for operating the apron 46". The bowl 130 is supported by a similar arrangement which includes upper and lower control arms 136 and 138, respectively, which extend between the frame member 132 and the side wall 140 of the rear bowl. The rear ends of the arms 136 and 138 are pivotally connected to the side wall 140 at vertically spaced points 142 and 144. The front ends of the arms 136 and 138 are pivotally connected at vertically spaced points 146 and 148 to the frame member 132 and a hydraulic cylinder 150 is provided for raising and lowering the rear bowl 130. An apron 152 pivoted at point 142 serves to close the mouth of the bowl 130 and is operated by the hydraulic cylinder 154.

Thus, it should be apparent that the scraper of FIG. 5 can be operated in a manner similar to the scraper shown in FIG. 4 in that rubber-tired drive units 11" and 12" are steerable about the axes B" and A" and both cutting blades 42" and 156 carried by the front and rear bowls 20" and 130 respectively, can either concurrently be lowered into the ground for cutting material or can be independently raised and lowered to permit one of the bowls to be operative during a cutting operation.

FIG. 6 shows a scraper 200 which is similar in certain respects to the scraper shown in FIG. 4 and therefore all parts corresponding to those incorporated with the scraper of FIG. 4 have been identified by identical numerals and reference is made to the above description relating to such parts for an understanding of their construction and operation. The primary difference between the two scrapers is that the cutting blades 42' and 201 are located at opposite ends of the bowl so that material is loaded in the front bowl when the scraper is moving to the left as viewed in the drawings, and the material is loaded in the rear bowl when the scraper is headed in the opposite direction. As a result, the rear bowl has an ejector 202 located back-to-back with the ejector 44' and an apron 204 is positioned at the rear of the bowl for movement about the point 118. Thus, with this form of scraper, it is only possible to load one bowl at a time. Another difference is the location of the operator's cab 206 which as shown is mounted between the front and rear bowls.

Various changes and modifications can be made in this construction without departing from the spirit of the invention. Such changes and modifications are contemplated by the inventor and he does not wish to be limited except by the scope of the appended claims.

I claim:

1. A scraper including first and second tandem bowls located between and respectively connected to a pair of rubber-tired first and second tractors, each of said bowls having an open front end defined by a pair of laterally spaced side walls and having a closed rear end, a horizontal blade extending transversely between and fixed to said side walls adjacent the open front end of each of said bowls, an apron carried by each of the bowls for closing said open front end thereof, a first draft assembly connecting said first tractor to said first bowl, said first draft assembly including a transversely extending section having a pair of laterally spaced side sections respectively located adjacent the pair of side walls of said first bowl, control arm means extending between each of said side sections and the adjacent side walls of said first bowl, means pivotally connecting one end of each of said control arm means to the adjacent side section, means pivotally connecting the other end of said control arm means to the adjacent side wall, power-operated means pivotally connected between said transversely extending section and the first bowl for moving the latter between a raised-carry position wherein the blade is out of contact with the ground and a lowered-dig position wherein the blade engages the ground independently of the position of said second bowl, a second draft assembly located between said first and second bowls, said second draft assembly including a second pair of laterally spaced side sections rigidly secured to the rear end of said first bowl and respectively located adjacent the pair of side walls of said second bowl, control arm means extending between each of the latter-mentioned side sections and the adjacent side walls of said second bowl, means pivotally connecting one end of each of the latter-mentioned control arm means to the adjacent latter-mentioned side section, means pivotally connecting the other end of said latter-mentioned control arm means to the adjacent side wall of the second bowl, and power-operated means connected between said first bowl and the second bowl for providing independent height adjustment of the second bowl relative to the first bowl.

2. A scraper including first and second tandem bowls located between and respectively connected to a pair of rubber-tired first and second tractors, each of said bowls having an open front end defined by a pair of laterally spaced side walls and having a closed rear end, a horizontal blade extending transversely between and fixed to said side walls adjacent the open front end of each of said bowls, a first draft assembly connecting said first tractor to said first bowl, said first draft assembly including a transversely extending section having a pair of laterally spaced side sections respectively located adjacent the pair of side walls of said first bowl, upper and lower parallel arms extending between each of said side sections and the adjacent side walls of said first bowl, means pivotally connecting said upper and lower arms to said side sections, means pivotally connecting the other end of said upper and lower arms to the adjacent side wall, power-operated means connected between said transversely extending section and the first bowl for moving the latter between a raised-carry position wherein the blade is out of contact with the ground and a lowered-dig position wherein the blade engages the ground independently of the position of said second bowl, a second draft assembly located between said first and second bowls, said second draft assembly including a second pair of laterally spaced side sections rigidly secured to the rear end of said first bowl and respectively located adjacent the pair of side walls of said second bowl, upper and lower parallel arms extending between each of the latter-mentioned side sections and the adjacent side walls of said second bowl, means pivotally connecting the latter-mentioned upper and lower arms to said latter-mentioned side sections, means pivotally connecting the other end of the latter-mentioned upper and lower arms to the adjacent side wall of the second bowl, and power-operated means connected between said rear end of said first bowl and the second bowl for providing independent height adjustment of the second bowl relative to the first bowl.

3. A scraper including first and second tandem bowls located between and respectively connected to a pair of rubber-tired first and second tractors, each of said bowls having an open front end defined by a pair of laterally spaced side walls and having a closed rear end, a horizontal blade extending transversely between and fixed to said side walls adjacent the open front end of each of said bowls, an apron carried by each of the bowls for closing said open front end thereof, a first draft assembly connecting said first tractor to said first bowl, said first draft assembly including a transversely extending section having a pair of laterally spaced side sections respectively located adjacent the pair of side walls of said first bowl, upper and lower parallel arms extending horizontally between each of said side sections and the adjacent side walls of said first bowl, means pivotally connecting one each of said upper and lower arms to each of said side sections, means pivotally connecting the other end of said upper and lower arms to said adjacent side wall, power-operated means pivotally connected between said transversely extending section and the first bowl for moving the latter between a raised-carry position wherein the blade is out of contact with the ground and a lowered-dig position wherein the blade engages the ground independently of the position of said second bowl, a second draft assembly located between said first and second bowls, said second draft assembly including a second pair of laterally spaced side sections rigidly secured to the rear end of said first bowl and respectively located adjacent the pair of side walls of said second bowl, upper and lower parallel arms extending horizontally between each of the latter-mentioned side sections and the adjacent side walls of said second bowl, means pivotally connecting the latter-mentioned upper and lower arms to said latter-mentioned side sections, means pivotally connecting the other end of the latter-mentioned upper and lower arms to the adjacent side wall of the second bowl, an operator's cab located on said second bowl, and power-operated means pivotally connected between said rear end of said first bowl and the second bowl for providing independent height adjustment of the second bowl relative to the first bowl.

References Cited

UNITED STATES PATENTS

| | | | |
|---|---|---|---|
| 629,826 | 8/1899 | Taylor | 37—127 |
| 895,631 | 8/1908 | Haase | 37—127 |
| 3,418,735 | 12/1968 | Martin | 37—129 |
| 3,445,946 | 5/1969 | Striggow | 37—4X |
| 3,483,644 | 12/1969 | Potgieter | 37—4X |
| 2,315,363 | 3/1943 | Armington et al. | 37—127H |
| 2,573,720 | 11/1951 | Lichtenberg | 37—FAL |
| 2,608,009 | 8/1952 | Schurmann | 37—124X |
| 3,183,609 | 5/1965 | Le Tourneau | 37—127 |
| 3,346,975 | 10/1967 | Lajoye | 37—118 |
| 2,883,774 | 4/1959 | Clifford | 37—127H |
| 3,486,251 | 12/1969 | Carston | 37—4 |

EDGAR S. BURR, Primary Examiner

U.S. Cl. X.R.

37—129